United States Patent
Young (10) Patent No.: US 8,050,802 B2
(45) Date of Patent: Nov. 1, 2011

(54) METHOD AND APPARATUS OF COMPENSATING FOR POSITION SHIFT

(75) Inventor: James M. Young, Santa Barbara, CA (US)

(73) Assignee: Bruker Nano, Inc., Santa Barbara, CA (US)

(*) Notice: Subject to any disclaimer, the term of this patent is extended or adjusted under 35 U.S.C. 154(b) by 629 days.

(21) Appl. No.: 11/556,583

(22) Filed: Nov. 3, 2006

(65) Prior Publication Data

US 2008/0121813 A1    May 29, 2008

(51) Int. Cl.
*G06F 19/00* (2011.01)

(52) U.S. Cl. .................. 700/279; 250/442.11

(58) Field of Classification Search .......... 700/279; 250/442.11, 307; 248/346.01; 430/5, 30; 216/59
See application file for complete search history.

(56) References Cited

U.S. PATENT DOCUMENTS

| | | | |
|---|---|---|---|
| 4,703,181 A | 10/1987 | Swann et al. | |
| 5,266,801 A | 11/1993 | Elings et al. | |
| RE34,489 E | 12/1993 | Hansma et al. | |
| 5,412,980 A | 5/1995 | Elings et al. | |
| 5,672,816 A * | 9/1997 | Park et al. | 73/105 |
| 5,750,989 A | 5/1998 | Lindsay et al. | |
| 5,805,448 A * | 9/1998 | Lindsay et al. | 700/71 |
| 5,852,232 A * | 12/1998 | Samsavar et al. | 73/105 |
| 6,196,061 B1 | 3/2001 | Adderton et al. | |
| 6,279,389 B1 | 8/2001 | Adderton et al. | |
| RE37,560 E * | 2/2002 | Elings | 310/316.01 |
| 6,448,555 B1 | 9/2002 | Hosokawa | |
| 6,798,569 B2 | 9/2004 | Bewersdorf et al. | |
| 7,253,407 B1 * | 8/2007 | Kley | 250/306 |
| 7,498,589 B2 * | 3/2009 | Maruyama et al. | 250/442.11 |
| 2002/0154396 A1 * | 10/2002 | Overbeck | 359/368 |
| 2005/0034512 A1 * | 2/2005 | Su et al. | 73/104 |
| 2005/0164229 A1 * | 7/2005 | Grandchamp et al. | 435/6 |
| 2005/0242283 A1 * | 11/2005 | Hasegawa et al. | 250/310 |

OTHER PUBLICATIONS

Lozanne, Scanning Probe Microscopy of high-temperature Superconductors, Oct. 7, 1998, Depertment of Physics, Universtiy of Texas, Austin, p. R43-R56.*
Veeco, A practical Guide to SPM, no date, Veeco, p. 1-29.*
Image & Microscopy, Scanning Probe Microscope Control, Jan. 2007, GIT VERKAG GmbH, No page number.*

* cited by examiner

*Primary Examiner* — Kidest Bahta
(74) *Attorney, Agent, or Firm* — Boyle Fredrickson, S.C.

(57) ABSTRACT

A levitated XY stage with a mechanism to disable the bearing element to allow the physical elements of the stage to come into contact with one another and "Coulomb weld" together, thereby eliminating drift. Preferably, the XY position shift of the stage that results from disabling the bearing is measured, and feed-forward communication to, for example, the AFM scanner is used to enable an offset and remove the error.

25 Claims, 7 Drawing Sheets

METHOD AND APPARATUS OF COMPENSATING FOR POSITION SHIFT

BACKGROUND OF THE INVENTION

1. Field of the Invention

The present invention is directed to a method and apparatus for minimizing the effects of drift on small scale metrology measurements, and more particularly, to a method and apparatus of correcting for a position shift from a tip-sample target location such as that which occurs during lock down of an air bearing stage used in a scanning probe microscope.

2. Description of Related Art

Several probe-based instruments monitor the interaction between a cantilever-based probe and a sample to obtain information concerning one or more characteristics of the sample. Such measurements are often made on the nanoscale so positioning between the probe and sample is a challenge and often leads to corrupted data. Known systems lack the desired precision and, moreover, are susceptible to factors that compromise the ability to obtain reliable data.

Scanning probe microscopes (SPMs), such as the atomic force microscope (AFM), are devices which typically use a sharp tip to make a local measurement of one or more properties of a sample. More particularly, SPMs typically characterize the surfaces of such small-scale sample features by monitoring the interaction between the sample and the tip of the associated probe assembly. By providing relative scanning movement between the tip and the sample, surface characteristic data and other sample-dependent data can be acquired over a particular region of the sample, and a corresponding map of the sample can be generated.

The atomic force microscope is a very popular type of SPM. The probe of the typical AFM includes a very small cantilever which is fixed to a support at its base and has a sharp probe tip attached to the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc. AFMs can obtain resolution down to the atomic level on a wide variety of insulating or conductive surfaces in air, liquid or vacuum. Because of their resolution and versatility, AFMs are important measurement devices in many diverse fields ranging from semiconductor manufacturing to biological research.

Preferably, the probe is scanned over a surface using a high-resolution three axis scanner acting on the sample support and/or the probe. The instrument is thus capable of creating relative motion between the probe and the sample while measuring the topography or some other property of the sample as described, for example, in Hansma et al. supra; Elings et al. U.S. Pat. No. 5,266,801; and Elings et al. U.S. Pat. No. 5,412,980.

AFMs can be designed to operate in a variety of modes, including contact mode and oscillating flexural mode. In an oscillation "flexural mode" of operation the cantilever oscillates generally about a fixed end. One flexure mode of operation is the so-called TappingMode™ AFM operation (TappingMode™ is a trademark of the present assignee). In a TappingMode™ AFM, the tip is oscillated flexurally at or near a resonant frequency of the cantilever of the probe. When the tip is in intermittent or proximate contact with the sample surface, the oscillation amplitude is determined by tip/surface interactions. Typically, amplitude, phase or frequency of this oscillation is kept constant during scanning using feedback signals, which are generated in response to tip-sample interaction. These feedback signals are then collected, stored, and used as data to characterize the sample. When measuring semiconductor samples, such as the trench capacitors discussed herein, a particular version of this oscillating mode known as deep trench (DT) mode, which employs a unique and costly tip, is used.

As metrology applications demand greater and greater throughput, and as the desirability of using SPM in a wide variety of applications requiring sub-micron measurements continues to grow, improvements to data acquisition using SPM have become necessary. Wafer analysis in the semiconductor industry is one key application. In general, chip makers want to measure structures (e.g., lines, vias, trenches, etc.) having critical dimensions (CDs) that are 90 nm and below. When analyzing these structures at such small scale, the corresponding measurements require uniformity control and must be able to accommodate high volume production environments. In this regard, one advancement has been in the area of automated AFMs which greatly improve the number of samples that may be imaged in a certain time frame by minimizing expert user tasks during operation. Instruments for performing automated wafer measurements are varied but AFM offers a unique solution by providing, for example, the ability to perform high-resolution multi-dimension (e.g., 3-D) imaging. Some instruments, like the Dimension X automated AFM offered by Veeco Instruments, have proven 200 mm and 300 mm automation platforms.

More particularly, two performance metrics to be considered when evaluating instruments used to make such measurements include throughput and repeatability. Throughput, in this case, typically is the number of wafers that may be imaged per unit time, and repeatability is the variation in results obtained from repeated measurements made on the same object under substantially identical conditions. These measurements most often must be proved prior to the tool being useful. A third issue concerns reproducibility, which is the variation that results when making the same measurement under different conditions. Reproducibility is important in that it determines whether the technique can accommodate condition variations when both positioning the wafer and focusing the optics. When considering these metrics, known systems have significant limitations.

One problem, for instance, is that repeatability, precision and accuracy can be severely compromised due to drift in the stage supporting the sample. Drift can occur during various phases of making AFM measurements, including during both set-up and operation. Notably, drift in this context is measured in nanometers/second. For conventional mechanical stages used in scanning probe microscopy, one to five nanometers/second of continuous drift is common. Clearly, if either the position of the tip or the position of the sample experiences drift before or during the measurement, an inaccurate measurement will be obtained. Drift affects the measurement in at least two ways, one being that repeating probe-sample positioning at a selected location on a line of the sample to be imaged, an important metric as understood in the art, is a challenge. Proving repeatability of the tool when drift is present can be nearly impossible. This becomes particularly challenging in view of the fact that there is enough variability in the line width that, if the tool is off by some fraction of the tip diameter when repeating the line measurement, a different measurement will be obtained.

The other primary reason data can be compromised by drift concerns line width variability. This problem is directly related to a metric that is monitored in semiconductor fabrication known as linewidth roughness (LWR), a measure of the variability of the width of the line itself.

Figure 1:
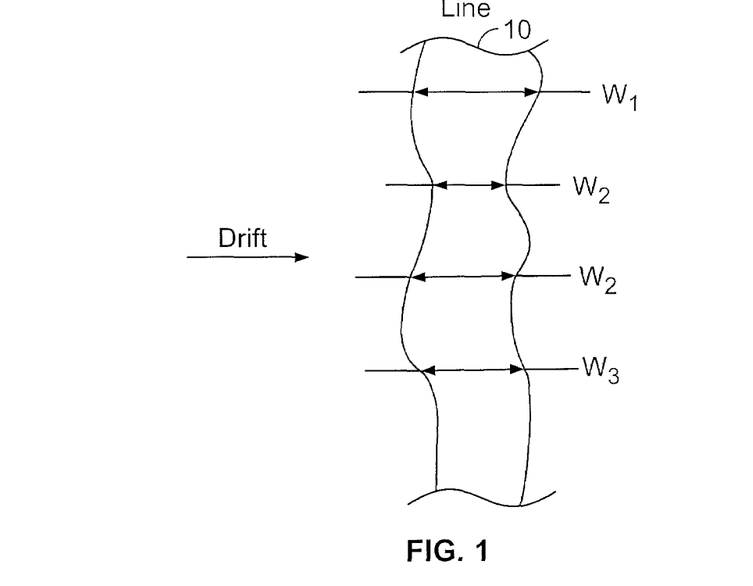
FIG. 1 is a schematic top plan view of a line to be imaged for an AFM illustrating linewidth roughness (LWR)

With current SPM systems, as a line of a sample is scanned at a number of different places, different measurements of line width are obtained depending on the LWR. This is illustrated in FIG. 1. FIG. 1 illustrates a single line 10 having a width varying in what is shown as the vertical or "Y" direction. Line width roughness or LWR is essentially the deviation from the average of the independent widths, W1, W2, W3, etc. Depending upon the location at which the tip contacts the sample, different data will result. In the context of drift, the apparent width of line 10 will be expanded if drift occurs in a direction of scanning, and narrowed when drift is opposite the direction of scanning. As a result, a component of LWR will be introduced that is not due to the line itself but to drift. In many cases, this is the largest impact on the data due to drift, even more so than position repeatability along the line, since it is used to construct sample surface images.

Notably, it is only with the recent advancements in the resolution of scanning probe microscopy that LWR can even be measured and accounted for using SPM. In many known systems, users would not know that a different measurement was being conducted because the data would be essentially the same, requiring semiconductor manufacturers to use tools such as an SEM, and its attendant drawbacks, as understood in the art, to perform such measurements.

Known attempted solutions to the problem of controlling drift of AFM sample stages include providing an air bearing stage with a lock-down scheme, such as a vacuum lock down stage. However, even though such stages can be effective in minimizing the effects of drift, none of these systems correct for the position error that occurs during the lock down operation.

More particularly, current air-bearing stage technology allows for precise translation and a final position lock during which the air bearing is de-activated, most typically by applying a magnetic or vacuum force. However, the tradeoff with the benefits of an air-bearing stage (e.g., minimal adverse effects due to drift, fine positioning substantially free of counteracting forces, etc.) is that the lock down operation contributes to a final position error. When lock down of the stage occurs at a commanded or target position (using vacuum or magnetic force, or even gravity, for instance), Coulomb welding between the two pieces of the stage occurs so that the whole system responds like a solid piece of material. This often causes at least a micron or two of position shift of the stage. Moreover, the stage will oftentimes tilt during lock down, further compromising the precise positioning required for the applications contemplated by the preferred embodiments.

As a result, what was desired in the field of making atomic force microscope (AFM) measurements, particularly in the semiconductor industry, was an improved stage and corresponding method that minimizes positioning errors (e.g., due to stage lock down and drift), including improving position repeatability and reproducibility along AFM scan lines, as well as achieving a linewidth roughness (LWR) repeatability that yields increased throughput for high volume applications, such as semiconductor wafer measurement.

SUMMARY OF THE INVENTION

The preferred embodiments overcome the above-noted drawbacks of known systems by providing an air bearing, hydrostatic bearing, or magnetic bearing XY stage with a mechanism to disable the bearing element to allow the physical elements of the stage to come into contact with one another and "Coulomb weld" together, thereby eliminating drift. Preferably, the XY position shift of the stage that results from disabling the bearing is measured. A look up table can be used to calibrate the stage or the error can be recorded by position encoders during operation. Feed-forward communication to, for example, the AFM scanner may be used to enable an offset and reduce or even remove the error. Correction of the XY position shift may be achieved using the measured position shift to alter the relative position between the probe and sample, for example, by actuating the AFM scanner.

According to a first aspect of the preferred embodiment, a method includes commanding a stage of a scanning probe microscope to move to a position, and locking the stage at the position. The method thereafter compensates for a stage position shift that occurs, for example, during the locking step.

In another aspect of this embodiment, the stage is a levitated stage, preferably one of a hydrostatic, magnetic and an air bearing stage. Moreover, the compensating step includes actuating a second stage.

In a further aspect of this embodiment, the method includes measuring the stage position shift and creating a look-up table including stage position shift versus commanded stage position. In this case, the compensating step utilizes the look-up table.

According to yet another aspect of this embodiment, the compensating step includes actuating a second stage based on the measured stage shift.

In a still further aspect of this embodiment, the compensating step includes modifying the commanded position based on the measuring step and locking the stage in the modified commanded position.

According to another aspect of this preferred embodiment, the measuring step is performed using at least one of a light-based position sensor, a capacitance sensor, a Linear Variable Differential Transformer (LVDT) and a non-contact inductive sensor.

According to a still further aspect of this embodiment, the locking step includes actively locking the stage in place.

In another aspect of this embodiment, the method includes performing a survey scan of less than 10 microns in length, preferably less than 8 microns, and more preferably less than 5 microns thus extending tip life and increasing throughput over known systems.

According to another aspect of this embodiment, the drift is less than about 0.5 nm/sec., preferably less than about 0.2 nm/sec. Most preferably, the drift is less than about 0.1 nm/sec.

According to a still further aspect of this embodiment, the method includes making a measurement of a sample property at a rate exceeding 125 sites per hour.

In another embodiment of the present invention, a method includes commanding a stage of a scanning probe microscope to move to a position, locking the stage in place, and measuring a sample property of a sample at a rate exceeding 125 sites per hour for samples that are 200 mm and 300 mm semiconductor wafers.

According to another aspect of this preferred embodiment, a scanning probe microscope (SPM) comprises a probe, a stage that is selectively movable to provide relative motion between the probe and a sample, a locking mechanism that selectively locks the stage in place and a control system that commands the stage to move to a position. The control system controls the SPM to compensate for a stage position shift, for example, a shift that occurs during locking of the stage.

In another aspect of this preferred embodiment, the control system compensates for the stage position shift by measuring the stage position shift.

In yet another aspect of this embodiment, the stage position shift is measured in real time.

According to a still further aspect of this embodiment, the stage position shift is measured during a calibration process to create a calibration factor and is implemented during SPM operation using the calibration factor.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

A scanning probe microscope, such as an atomic force microscope (AFM) operates by providing relative scanning movement between a measuring probe and a sample while measuring one or more properties of the sample. A typical AFM system is shown schematically in FIG. 2. An AFM 11 employing a probe device 12 including a probe 14 having a cantilever 15 is coupled to an oscillating actuator or drive 16 that is used to drive probe 14 to oscillate, in this case, at or near the probe's resonant frequency. Commonly, an electronic signal is applied from an AC signal source 18 under control of an AFM controller 20 to cause actuator 16 to drive the probe 14 to oscillate, preferably at a free oscillation amplitude AO. Probe 14 is typically actuated to move toward and away from sample 22 using a suitable actuator or scanner 24 controlled via feedback by controller 20. The actuator 16 may be coupled to the scanner 24 and probe 14 or may be formed integrally with the cantilever 15 of probe 14 as part of a self-actuated cantilever/probe.

Figure 2:
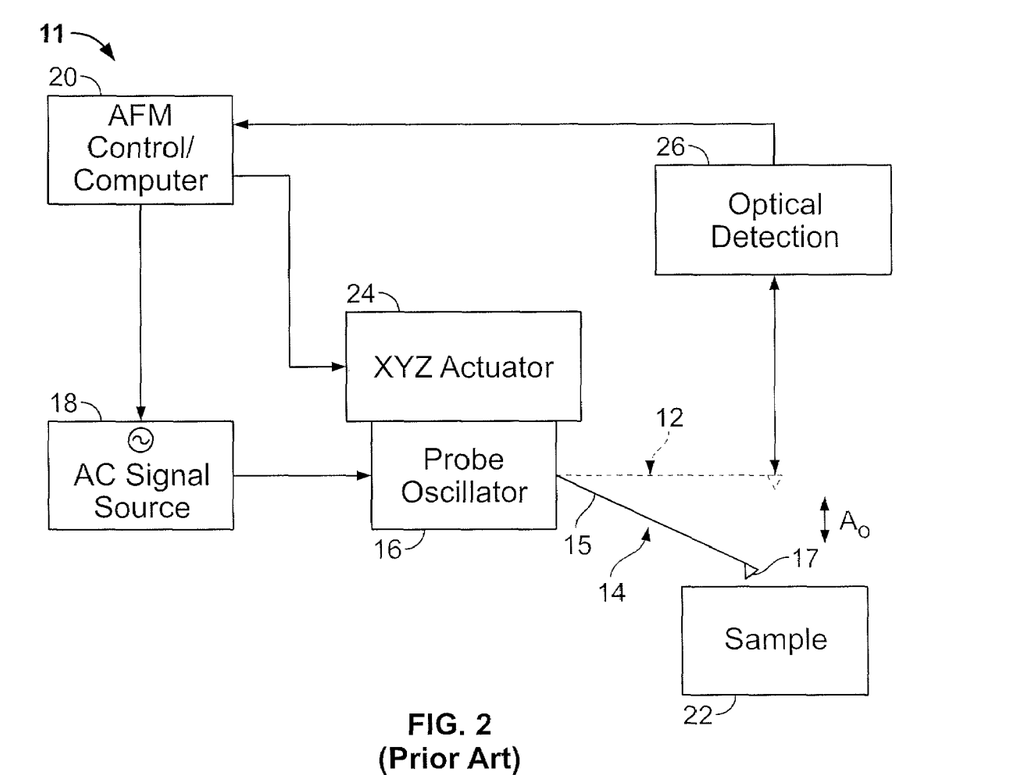
FIG. 2 is a schematic block diagram of an atomic force microscope, appropriately labeled "Prior Art"

Scanner 24 may be a single XYZ actuator that moves either the sample or probe. Alternatively, the scanner may be divided into separate components, for example an XY scanner moving the sample and a Z actuator moving the probe. Any permutation of probe and sample motion that generates relative motion between the probe and sample will suffice. Scanners usually contain piezoelectric actuators, but can also be constructed from other actuator mechanisms, including electrostrictive, magnetostrictive, thermomechanical, electrostatic and magnetic actuators. Recently AFMs have been constructed using micro machined scanners employing MEMS (Micro Electronic Mechanical Systems) technology.

One or more probes may be loaded into the AFM and the AFM may be equipped to select one of several loaded probes. Typically, the selected probe 14 is oscillated and brought into interaction with sample 22 as sample characteristics are monitored by detecting changes in one or more characteristics of the oscillation of probe 14, as described above. In this regard, a deflection detection apparatus 17 is typically employed to direct a beam towards the backside of probe 14, the beam then being reflected towards a detector 26, such as a four quadrant photodetector. As the beam translates across detector 26, appropriate signals are transmitted to controller 20, which processes the signals to determine changes in the oscillation of probe 14. Commonly, controller 20 generates control signals to maintain a constant force between the tip and sample, typically to maintain a setpoint characteristic of the oscillation of probe 14. For example, controller 20 is often used to maintain the oscillation amplitude at a setpoint value, As, to insure a generally constant force between the tip and sample. Alternatively, a setpoint phase or frequency may be used.

Commonly, scanner 24 is a piezoelectric actuator possibly in combination with mechanical flexures that is used to generate relative motion between the measuring probe and the sample surface. A piezoelectric actuator is a device that moves in one or more directions when voltages are applied. As mentioned previously, many other actuator technologies may be employed, keeping in mind the scanner comprises one or more actuators that move in response to a control signal. Actuators may be coupled to the probe, the sample, or both. Most typically, an actuator assembly is provided in the form of an XY actuator that drives the probe or sample in a horizontal, or XY plane and a Z actuator that moves the probe or sample in a vertical or Z direction.

As noted previously, positioning between the probe and sample when analyzing different regions of a sample is critical to the AFM's ability to provide acceptable high quality data. Drift can severely compromise this goal, as can lockdown shift for levitated stages. The preferred embodiments overcome the limitations of prior arrangements in this regard.

Figure 3A:
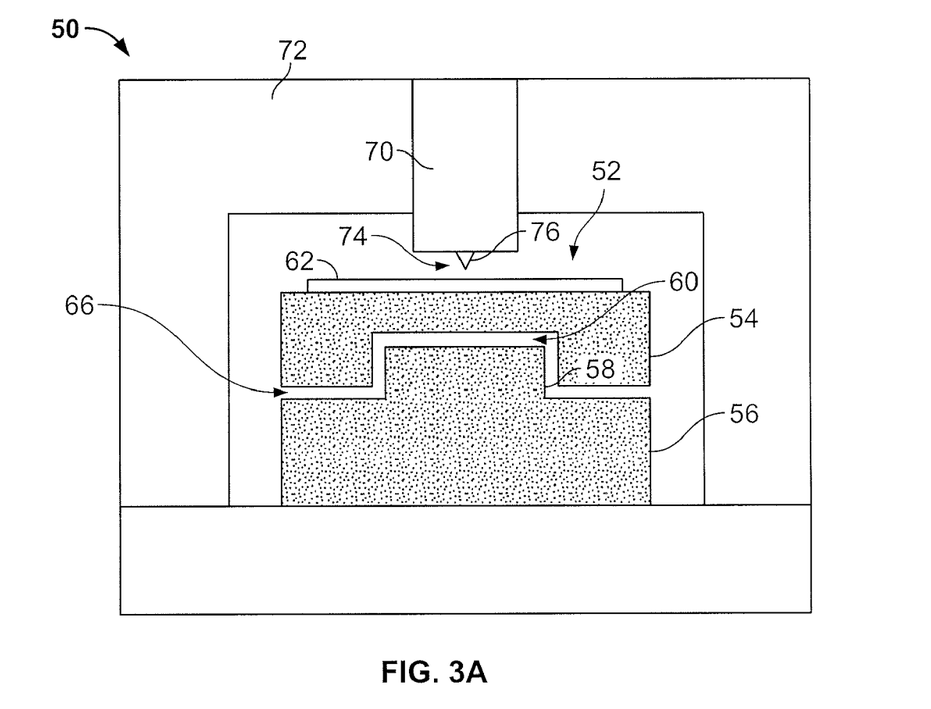
FIG. 3A is a schematic front elevation view of an atomic force microscope (AFM) for imaging a sample disposed on a fluid-bearing stage.

Turning to FIG. 3A, a SPM system 50 according to a preferred embodiment includes a levitated stage, preferably an air bearing stage 52 (e.g., an XY stage) having a stage carriage 54 registered to an XY stage base 56 using a guide rail 58 that mates with a corresponding opening 60 of carriage 54. Notably, such a stage 52 is able to provide highly precise positioning and thus is particularly useful for metrology tools such as SPMs that perform sub-micron measurements. A sample 62 to be scanned is supported by carriage 52 and may be for example, an eight inch semiconductor wafer. In this case, carriage 52 can be manipulated in two orthogonal directions to position sample 62 at a location of interest. Though the illustration in FIG. 3A shows single axis translation of carriage 54, this is shown for the purposes of illustration only, and actuation of the sample can be performed in multiple directions with an appropriately configured stage. Moreover, although preferably used to actuate the sample, stage 52 can be used to actuate an SPM probe, or some combination thereof. And though an air-bearing stage is shown, a hydrostatic or magnetic, or ultrasonic bearing stage, or the like, could be employed.

Between carriage 54 and base 56 is a gap 66 that accommodates a fluid such as air that acts as a bearing during stage carriage translation. Once sample 62 is located, stage 52 can be locked down by removing the air bearing in gap 66, hence "Coulomb welding" the surfaces as described previously and ultimately minimizing drift of sample 62 from the target location.

Adjacent to and in this case above stage 52 is an AFM head 70 mounted to a reference structure 72, head 70 including a probe 74 having a tip 76 adapted to interact with sample 62. AFM 70 preferably includes an XYZ actuator (not shown in FIG. 3A), such as a piezoelectric tube or assembly of one or more piezoelectric stacks and mechanical flexures, that is able to translate the probe in three orthogonal directions. Reference structure 72 is a superstructure made of a suitable material (low coefficient of thermal expansion, etc.) such as Invar® designed to minimize the effects of adverse environmental phenomena such as drift and vibration, and thus maximize the AFM's ability to obtain high quality data.

Figure 3B:
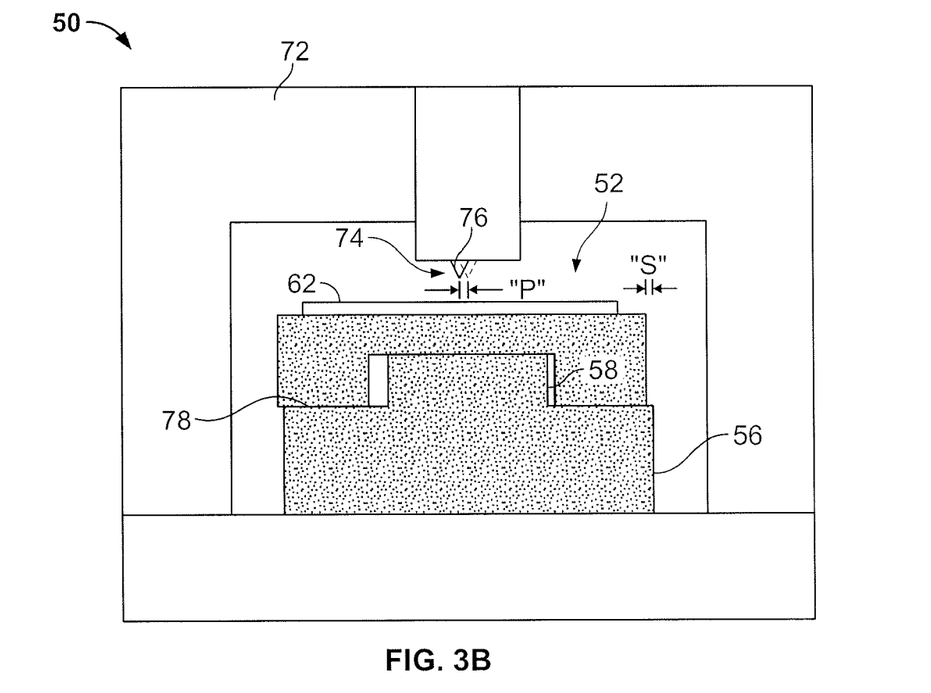
FIG. 3B is a schematic front elevation view of the AFM and stage of FIG. 3A, illustrating "lock down" at a location of interest.

In operation, when a location of interest is identified, a command signal, provided either automatically or manually entered by the AFM operator, instructs the stage carriage 54 to correspondingly position sample 62 for imaging by the AFM. Once located as shown in FIG. 3A, carriage 54 is locked down to base 56 with an appropriate command signal. This is illustrated in FIG. 3B. Notably, lock down can be an active or a passive operation. Actively locking the stage down typically involves pulling the stage 54 using applied force, for example, generated by a vacuum, piezoelectric, pneumatic, or a magnetic device, or any similar actuator capable of applying a positive locking force. Passively locking down the stage, on the other hand, may involve removing the bearing, allowing gravity to operate thereon, or using some compliant device, for example a spring or a flexure.

In FIG. 3B, as carriage 54 is locked down to base 56, a position shift results which is illustrated as a shift "S" of stage 52. As noted previously, shift "S" can be microns long and thus significantly compromise the ability to obtain reliable data when imaging the features of interest. Moreover, once the lock down command is executed, carriage 54 and base 56 lock to one another as described previously, resulting in stage 52 behaving as a solid unitary structure and locking the shift between AFM 70 and stage 52. As a result, to overcome the adverse affects of this shift on position repeatability and measured LWR, for instance, the preferred embodiments operate to adjust the relative position of AFM probe 74 and sample 62 and does so based on a measured position shift, as described in further detail below.

Figure 4:
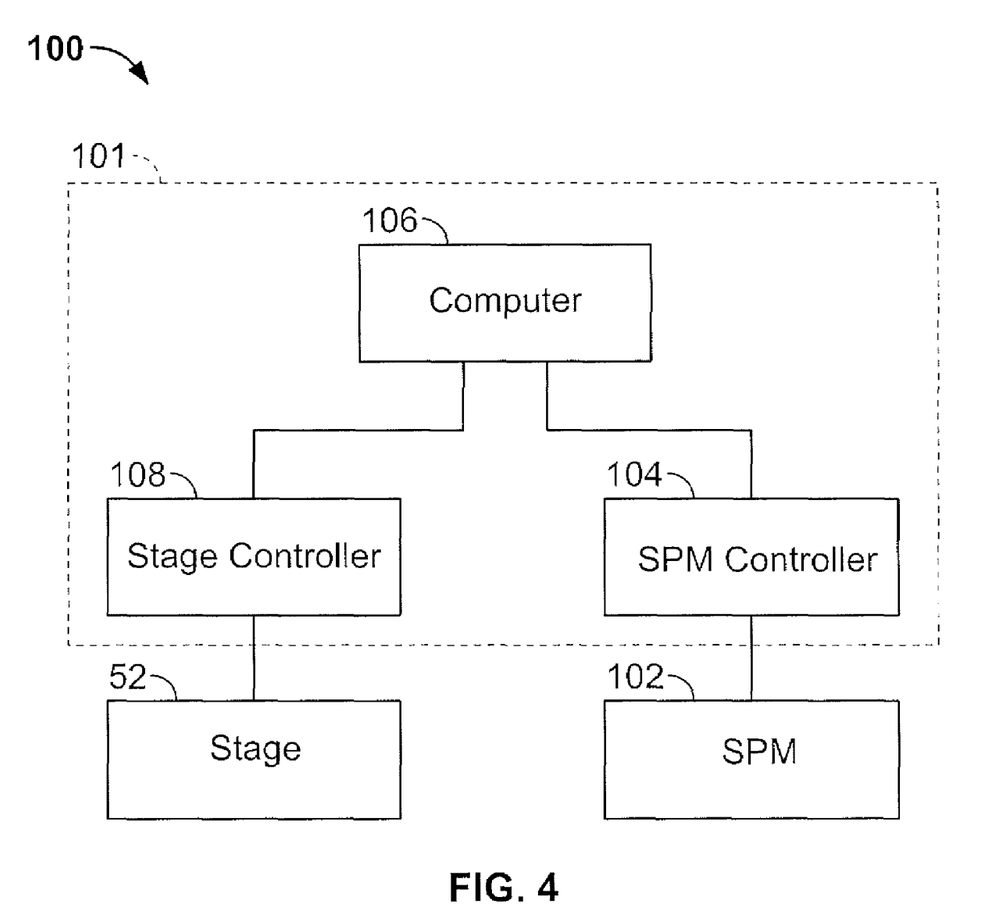
FIG. 4 is a block diagram of an AFM according to a preferred embodiment, including drift compensation control apparatus.

FIG. 4 illustrates a preferred embodiment of an SPM system 100 including a control system 101 coupled to stage 52 and an SPM 102 such as AFM head 70. SPM 102 is coupled to an SPM controller 104 that implements commands via a computer 106. For example, the commands may be provided automatically (e.g., a pre-set data acquisition program) or manually by an operator. A stage controller 108 is also provided to position carriage (54 in FIGS. 3A & 3B) of air-bearing stage 52 at a target location in response to appropriate signals, typically to focus on a feature or region of interest. As noted above, based on a measured/predicted position shift, the relative position between the probe of SPM 102 and the sample is adjusted to compensate, for example, the position shift that occurs during lockdown at the target location, illustrated in FIG. 3B. In this regard, computer 106 is used to instruct controller 104 to actuate, for example, a scanner of SPM 102 an amount "P," as shown in FIG. 3B, to compensate for the position shift. Alternatively, a separate fine position actuator (see FIG. 7 and discussion below, for instance) can be provided to translate stage 52 and thus compensate for the offset caused by lock down shift. Notably, the compensation described herein is often referred to with respect to correcting position shift caused by lock-down of the air-bearing stage; however, the preferred embodiments can operate to compensate any position shift caused by any source including, for example, position shifts more generally such as those due to drift.

Figure 5:
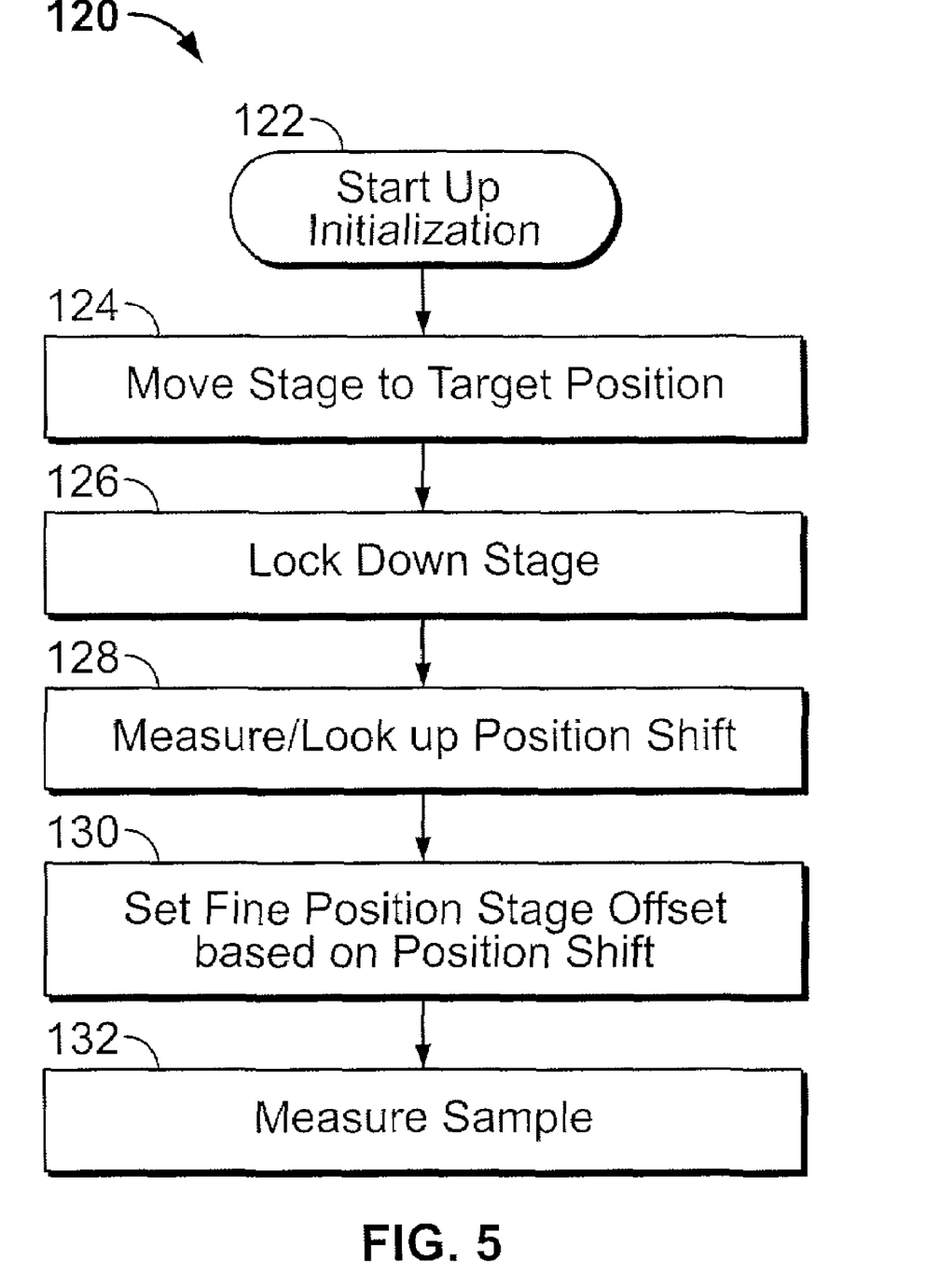
FIG. 5 is a flow diagram illustrating a drift compensation method according to one embodiment.

A correction algorithm 120 of the preferred embodiment is illustrated in FIG. 5. Initially, after a start-up and initialization step in Block 122, a command is sent via computer 106 to stage controller 108 in Block 124 that causes carriage 54 of stage 52 to move to a target position, preferably in response to user input. Then, carriage 54 is locked down with respect to base 52 in Block 126, as described above.

In Block 128, the stage position shift caused by lockdown or otherwise, is determined. The shift may be measured at that time, or, if the shift was measured previously, a look-up table may be summoned to identify an expected shift of the stage associated with the target location. Alternatively, rather than measuring the position shift (real time or during a calibration procedure), the position shift can be determined using a program developed for the stage in which the stage position shift is modeled by an equation derived based on the known characteristics or behavior of the stage.

In the case in which the stage is calibrated, the look-up table may be developed by calibrating the stage at the location of the manufacturer. In this regard, the manufacturer preferably actuates the stage to an array of x, y locations and then measures the actual stage position shift at each location using, for example, a sensor such as an optical linear encoder. A look-up table of compensation or calibration factors (e.g., offsets associated with each scan position) is then developed for each of the (x, y) locations.

When a command is sent to actuate carriage 54 to a particular location (x, y), the look-up table can then be used to identify an expected position shift which is compensated by correcting tip-sample positioning prior to conducting an imaging operation. In the case shown in FIG. 5, the position shift identified in Block 128 is used to set a stage offset in Block 130. Notably, the apparatus may employ a second stage, such as a separate fine position actuator to move either the probe or the stage (52 in FIGS. 3A and 3B) according to the offset associated with the target location after it has been locked down. The fine position actuator could be a piezoelectric-based flexure, for instance.

Alternatively, the second stage can be the scanning actuator. In that case, the compensation is preferably implemented using the offset to correspondingly translate the center of the scan by an amount corresponding to the offset, the scan center typically set upon start-up, as understood in the art. Once the stage position shift has been compensated, measurements of the sample can proceed in Block 132.

Note that many AFM scans already contain an offset from the center of the scanning actuator's range. In this case it is not necessary to perform a second offsetting step. Instead it is sufficient to mathematically add the desired scan offset plus the offset to compensate for the stage shift. The total offset is then applied to the scanning actuator to simultaneously accomplish the scan offset and the compensation step.

Figure 6:
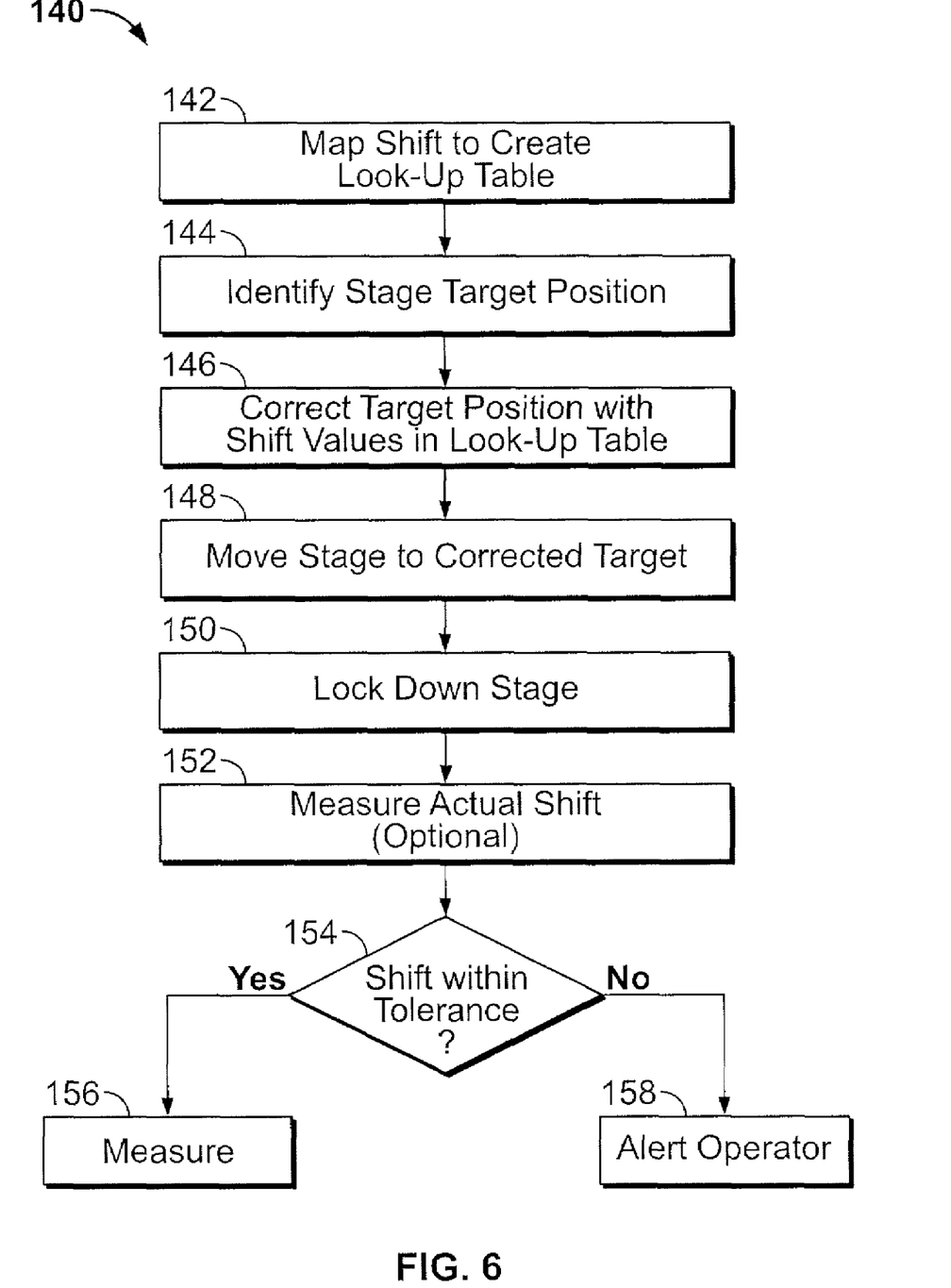
FIG. 6 is a flow diagram illustrating a drift compensation method according to an alternate embodiment.

Turning to FIG. 6, an alternative shift compensation algorithm 140 is illustrated. In this case, the shift corresponding to each scan position (x, y) is mapped to create a look-up table in Block 142. Once the user selects a feature of interest, a location is determined, typically by performing a survey scan and a pattern recognition operation (see FIG. 9 and discussion below) to identify a stage target position in Block 144. The target position is then modified to accommodate the expected shift associated with that target position using the shift or offset values stored in the look-up table generated in Block 142. Thereafter, in Block 148, the stage can be moved to the corrected target position determined in Block 146. With the target position corrected, the stage can then be locked down for sample measurement by the AFM in Block 150. Notably, the modified target position is determined so that, when the stage is locked down and a corresponding shift occurs, the modification to the target position accounts for the shift.

According to the additional, and optional, steps of algorithm 140, once the stage is locked down, the AFM, and more particularly, a position sensor (see below), may be used in Block 152 to measure the actual shift. In Block 154, that measured shift is compared to a selected tolerance. A tolerance in the range of 10 nm-100 nm is typically acceptable. In the event that the measured shift is within the tolerance range, the sample may be measured in Block 156. If, however, the shift is not within the accepted tolerance, the operator is notified with an appropriate alert in Block 158, preferably prompting the operator with specific data to allow the user to decide whether to go forward with sample measurement.

Figure 7:
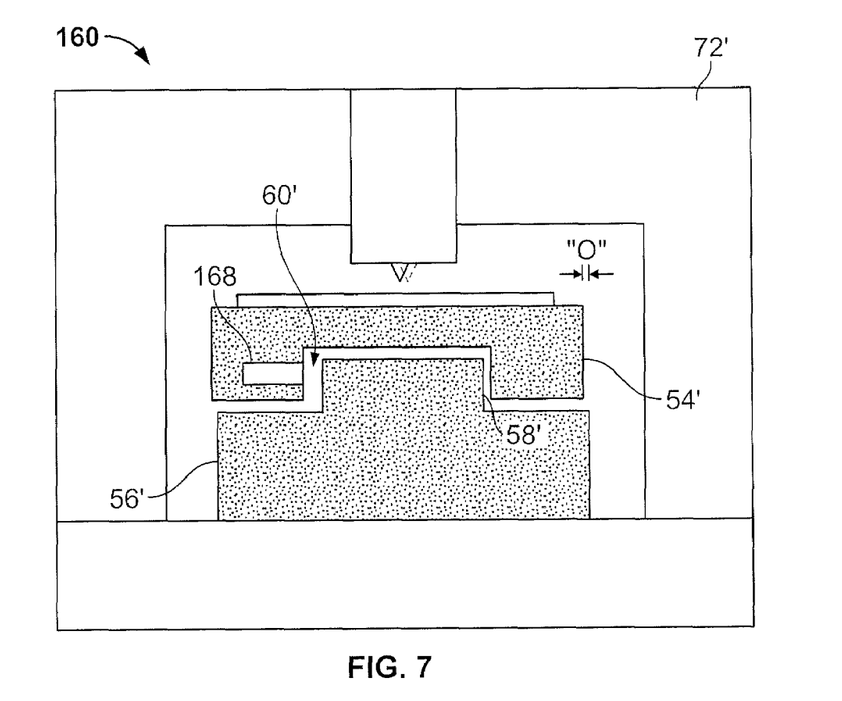
FIG. 7 is a schematic front elevation view of a stage incorporating a short range position sensor to measure position shift.

Turing to FIG. 7, a stage 160 equipped to measure position is shown. Stage 160 includes a stage carriage 54' supporting, in this case, a sample 62' and a stage base 56' having a center rail 58' upon which carriage 54' is guided. As carriage 54' is locked down to base 56', passively or actively, an offset "O" results due to the lockdown operation. As a result, and as described in connection with the algorithms illustrated in FIGS. 5 and 6, the amount of this position shift can be measured with an appropriate sensor 168 mounted to carriage 54'. As a result, translation of carriage 54' relative to base 56' coupled to reference structure 72' can be measured. The stage position shift can then be utilized by the algorithms of the preferred embodiments to compensate for the shift by enabling a corresponding offset so as to maximize the integrity of the data obtained, including improving repeatability and accuracy of LWR measurement.

Figure 8:
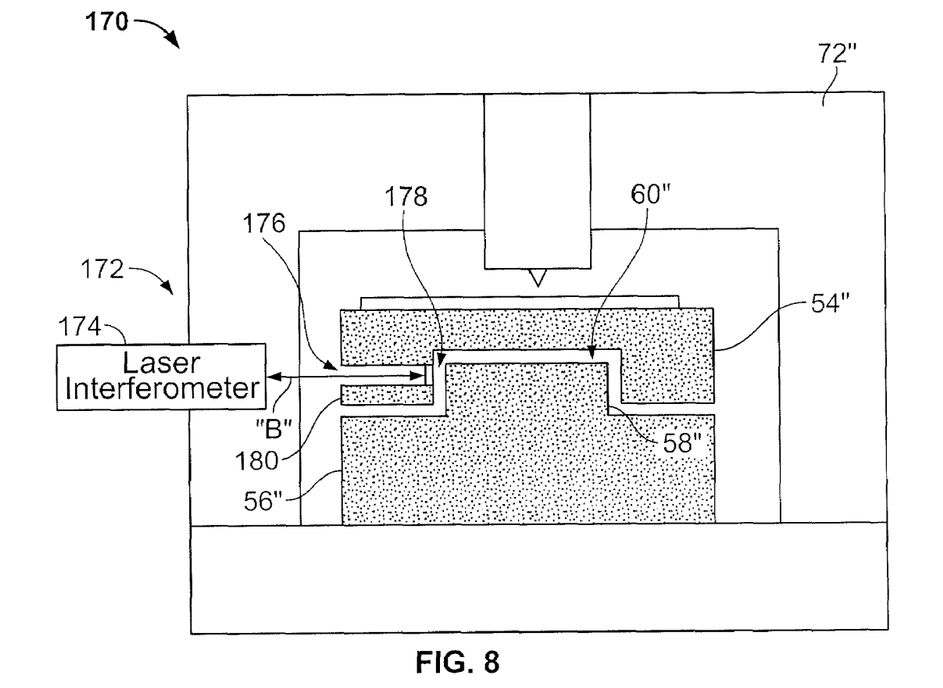
FIG. 8 is a schematic front elevation view of an alternate position sensor including a laser interferometer.

Sensor 168 may be a light-based position sensor such as an interferometer, a laser triangulation sensor, a linear optical encoder or the like. Alternatively, sensor 168 could be a capacitance sensor, a linear variable differential transformer (LVDT), a non-contact inductive sensor, or any other sensor suitable for high precision measurements. In this regard, combinations of two or more sensors may also be employed. Turning to FIG. 8, a stage 170 equipped with a laser interferometer is shown as still another example.

Stage 170 of this embodiment includes a stage carriage 54" and a stage base 56" having a guide rail 58" that mates with a corresponding opening 60" of carriage 54" to guide carriage 54" with respect to base 56". A light-based position sensor 172 including a laser interferometer 174 is provided to measure the position of stage 170. More particularly, stage carriage 54" includes an opening 176 to accommodate one or more light beams "B" emitted by laser interferometer 174 towards center rail 58" which is fixed. In operation, as the moving stage or carriage 54" translates, the beams "B" transmitted by laser interferometer 174 contact center rail 58", which is equipped with a reflective element 178, and return to the laser interferometer for determination of the amount of translation (depending on phase of the laser light, for example), as understood in the art. The moving stage or carriage 54" defines a reference surface 180 for making the measurements with the sensor relative to the fixed center rail 58". Note, FIG. 8 is provided to illustrate an example of a sensor and it is contemplated that other sensors readily adaptable to SPM tools are within the scope of the preferred embodiments.

Figure 9:
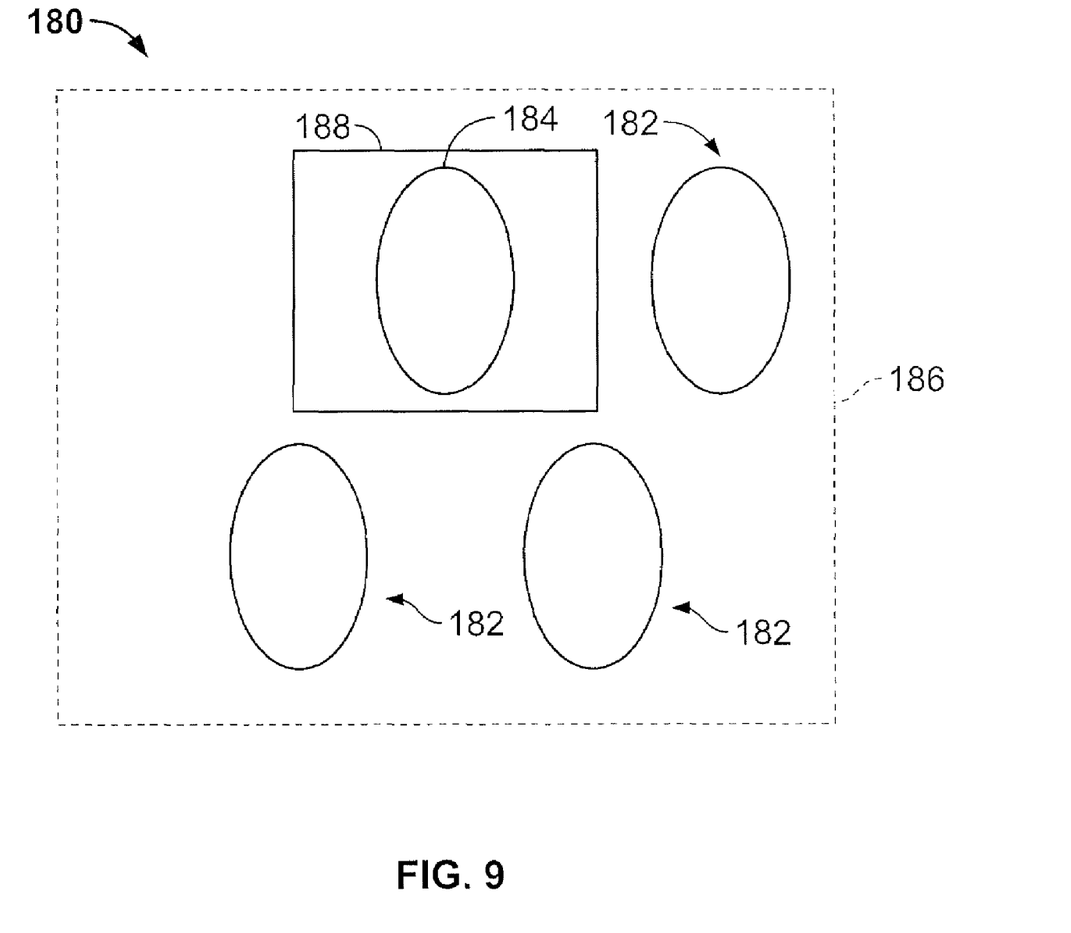
FIG. 9 is a schematic top view of a sample illustrating the dimensions of a survey scan and a corresponding image scan.

Notably, improving accuracy and repeatability of tip-sample positioning not only facilitates producing high integrity image data, but also operates to improve speed of SPM operation and tip life longevity. For instance, one advantage of the preferred embodiments is that, often times, a survey scan such as that illustrated in FIG. 9 and described above, is performed to identify a region of interest before a final scan is conducted on a target feature. As shown in FIG. 9, a sample 180 including an array of features 182 to be imaged includes a feature of interest 184 that must be identified. In some cases, a survey scan 186 of sample 180 is performed to identify the features 182. This is done with a relatively coarse scan which is able to identify the features 182, with the feature of interest 184 and its associated target location capable of being identified, for example, by conducting a pattern recognition operation on the coarse data. In this way, feature of interest 184 is identified prior to performing a comprehensive scan of the entire sample or even a subregion thereof. Moreover, as a result, the survey scan operates to prolong tip life and minimize the time spent generating a detailed image of portions of the sample of less interest, including those areas outside the target location.

In known systems with low position precision, lock down shift, and its associated uncertain positioning, typically requires survey scans to be large to identify the feature of interest. As a result, such systems see significant wear of the tip prior to any data being obtained. This is a significant issue given that the probes used by most AFMs can be very expensive, each costing as much as a thousand dollars or more. Therefore, minimizing the size of the survey scan or the need to do a survey scan at all is a significant benefit to increased precision, repeatability, throughput, and sustaining tip life.

Overall, with the precision, repeatability and accuracy provided by the present apparatus and methods, features of interest can be readily identified and tip-sample position reliably located. As a result, the size of the corresponding survey scan can be reduced significantly, and in some cases, the survey scan can be eliminated. Moreover, by minimizing or eliminating the survey scan, additional throughput benefits are achieved. For example, conventional AFMs are able to obtain topographical images of samples at about approximately 125 sites per hour on 200 mm and 300 mm wafers. With the improved position accuracy provided by the present preferred embodiments, throughput can be increased significantly. In view of the high throughput requirements of most semiconductor fabrication facilities, the preferred embodiments provide significant advantages when making such measurements.

More specifically, a discussion of CD precision and drift follows. Typically, high precision air bearing stages can achieve positioning accuracy of less than +/−0.5 micron over 300 mm range of travel. The addition of a lock down mechanism can degrade the accuracy by as much as +/−1.5 μm, resulting in a total accuracy of greater than about +/−2 μm. As a result, survey scans of greater than 5 μm may be required With the preferred embodiments, up to about a 4× reduction in survey scan size and corresponding survey scan time can be realized by mitigating accuracy degradation due to lock down or parking shift. Exemplary benefits include increased throughput and reduced tip wear, with the magnitude of improvement dependent on the particular application. Moreover, by being to perform survey scans of less than about five (5) microns in length, the present invention provides improvements with respect to repeatability including the ability to more easily and accurately identify a feature in a repeated pattern of the sample.

Simulations show that reduction of drift from 1 nm/sec to 0.1 nm/sec can improve CD measurement precision by 4× for typical tip radius and line shape. Reduction of drift in this fashion facilitates achieving the parameters of the ITRS roadmap for CD precision. (See Table 1)

TABLE 1

ITRS requirements

| | | Year | | | | | | |
|---|---|---|---|---|---|---|---|---|
| | | 2007 | 2008 | 2009 | 2010 | 2011 | 2012 | 2013 |
| Node (Half-pitch | | 65 nm | 57 nm | 50 nm | 45 nm | 40 nm | 35 nm | 32 nm |
| LWR (3σ) | | 2.8 | 2.6 | 2.2 | 2 | 1.8 | 1.6 | 1.4 |
| CD Precision | Isolated Lines | 0.4 nm | 0.4 nm | 0.4 nm | 0.3 nm | | 0.3 nm | 0.2 nm |
| | Dense Lines | 1.6 nm | 1.4 nm | 1.2 nm | 1.1 nm | | 0.9 nm | 0.8 nm |
| | LWR | 0.4 | 0.4 | 0.3 | 0.29 | | 0.22 | 0.21 |

In particular, line width roughness (LWR) measurement precision is an metric of particular interest. Line width roughness (LWR) precision is influenced by drift perpendicular to the measured line, as shown in FIG. 1. Given a component of drift having a magnitude $v_d$ perpendicular to the measured line, the impact on line width can be analyzed. If the line takes $\delta t$ seconds to traverse, the apparent width of the line will be increased by $\delta x_{pos}$ when scanning in the same direction as the drift, and decreased by $\delta x_{neg}$ when scanning in the reverse direction, as follows, $$\delta x_{pos} = v_d \delta t \quad \text{(Equation 1)}$$

$$\delta x_{neg} = -v_d \delta t \quad \text{(Equation 2)}$$

This results in an additional LWR component equal to about $2 v_d \delta t$. Since the drift bias is uncorrelated with the true LWR of the line, the measured LWR (3 σ), $LWR_{meas}$, is given by, $$LWR^2_{meas} = LWR^2 + (2v_d \delta t)^2 \quad \text{(Equation 3)}$$

$$\Delta LWR = 2v_d \delta t \quad \text{(Equation 4)}$$

And given the ITRS requirements of Table 1, the LWR precision desired for the 32 nm node is 0.21 nm. Assuming $\delta t = 0.5$ sec., $$2v_d \delta t < 0.21 \text{ nm} \quad \text{(Equation 5)}$$

$$v_d < 0.21 \text{ nm/s} \quad \text{(Equation 6)}$$

For the lock down air bearing stage of the preferred embodiments, this amount of drift can be readily maintained, with the preferred amount of drift being held to about 0.1 nm/s. By comparison, the best drift rates of about 1 nm/s achieved using known mechanical stages result in a LWR error of about 1 nm, and thus exceed the ITRS requirement by close to 5×.

Overall, using the present levitated stage shown and described herein, stage drift is minimized, preferably exhibiting no more than about 0.5 nm of drift per second. And more preferably, stage drift is kept to no more than about 0.1 nm/sec, well within the range of CD precision for the 32 nm node of the ITRS roadmap. In addition, when making measurements with SPMs using the stage of preferred embodiments, RMS noise is preferably no more than about 1 nm for operating bandwidths of about 1 kHz. In this way, the above performance metrics, including, for example, the capability of measuring forty wafers per hour, can be achieved while maintaining data integrity.

Although the best mode contemplated by the inventors of carrying out the present invention is disclosed above, practice of the present invention is not limited thereto. It will be manifested various additions, modifications and rearrangements of the features of the present invention may be made without deviating from the spirit and scope of the underlying inventive concept.

What is claimed is:

1. A method comprising:
 moving a stage of a scanning probe microscope to a position;
 locking the stage at the position;
 determining a stage position shift;
 compensating for the stage position shift based on the determining step; and
 wherein the stage is a levitated stage, and wherein the stage position shift occurs during the locking step.

2. The method of claim 1, wherein the stage is one of an air bearing stage, a magnetic bearing stage and a hydrostatic bearing stage.

3. The method of claim 1, wherein the compensating step comprises actuating a scanner.

4. The method of claim 1, wherein the determining step includes measuring the stage position shift.

5. The method of claim 1, wherein the determining step comprises using a look-up table including stage position shift versus commanded stage position, and wherein the compensating step utilizes the look-up table.

6. The method of claim 4, wherein the compensating step comprises actuating a second stage based on the measured stage shift.

7. The method of claim 4, wherein the compensating step comprises modifying a commanded position based on the determining step and locking the stage in the modified commanded position.

8. The method of claim 4, wherein the determining step is performed via operation of at least one of a light-based position sensor, a capacitance sensor, a Linear Variable Differential Transformer (LVDT), and a non-contact inductive sensor.

9. The method of claim 4, wherein the measuring step is performed using a capacitance sensor.

10. The method of claim 1, wherein the locking step comprises actively locking the stage in place.

11. The method of claim 1, further comprising performing a survey scan of less than about 8 microns in length.

12. The method of claim 11, further comprising performing a survey scan of less than about 5 microns in length.

13. The method of claim 1, wherein after the stage is locked in place, stage drift is less than about 0.5 nm/sec.

14. The method of claim 13, wherein after the stage is locked in place, stage drift is no more than about 0.1 nm/sec.

15. The method of claim 1, wherein after the stage is locked in place, the RMS noise of an SPM measurement of a sample is less than about 1 nm for a bandwidth of about 1 kHz.

16. A method comprising:
commanding a stage of a scanning probe microscope to move to a position;
locking the stage in place;
measuring a sample property of a sample at a rate exceeding 125 measurements per hour, wherein the sample is at least one of 200 mm and 300 mm semiconductor wafers; and
wherein the stage is a levitated stage, and wherein the stage position shift occurs during the locking step.

17. The method of claim 16, further comprising performing a survey scan of less than about five (5) microns in length.

18. A scanning probe microscope (SPM) comprising:
a probe;
a stage that is selectively movable to provide relative motion between the probe and a sample;
a locking mechanism that selectively locks the stage in place; and
a control system that controls the SPM to compensate for a stage position shift; and
wherein the stage position shift occurs during locking of the stage, wherein the stage is a levitated stage, and wherein the stage position shift occurs during the locking step.

19. The SPM of claim 18, wherein the control system compensates for the stage position shift by measuring the stage position shift.

20. The SPM of claim 19, wherein the stage position shift is measured in real time.

21. The SPM of claim 20, wherein the stage position shift is measured using at least one of a light-based position sensor, a capacitance sensor, a Linear Variable Differential Transformer (LVDT), and a non-contact inductive sensor.

22. The SPM of claim 18, wherein the stage position shift is measured during a calibration process to create a calibration factor and is implemented during SPM operation using the calibration factor.

23. The SPM of claim 18, wherein the stage position shift corresponds to the position and is determined based on a model developed for the stage.

24. The SPM of claim 18, wherein a survey scan of less than about five (5) microns in length can be performed to identify a feature in a repeated pattern of the sample.

25. The method of claim 1, wherein the levitated stage includes a carriage and a base, and the position shift is caused by locking the carriage to the base.

* * * * *